United States Patent
Kutscher et al.

(10) Patent No.: US 9,937,882 B2
(45) Date of Patent: Apr. 10, 2018

(54) ATTACHMENT FOR BUMPER BEAM ENABLING ADDITIONAL FUNCTION ASSEMBLY

(71) Applicants: CONSTELLIUM SINGEN GMBH, Singen (DE); BAYERISCHE MOTOREN WERKE AKTIENGESELLSCHAFT, Munich (DE)

(72) Inventors: Matthias Kutscher, Constance (DE); Egon Mayr, Tegernbach (DE); Christian Muselmann, Munich (DE); Ivan Grbavac, Stockach (DE)

(73) Assignee: CONSTELLIUM SINGEN GMBH, Singen (DE)

( * ) Notice: Subject to any disclaimer, the term of this patent is extended or adjusted under 35 U.S.C. 154(b) by 0 days.

(21) Appl. No.: 15/518,985

(22) PCT Filed: Oct. 9, 2015

(86) PCT No.: PCT/EP2015/073476
§ 371 (c)(1),
(2) Date: Apr. 13, 2017

(87) PCT Pub. No.: WO2016/058955
PCT Pub. Date: Apr. 21, 2016

(65) Prior Publication Data
US 2017/0240127 A1    Aug. 24, 2017

(30) Foreign Application Priority Data
Oct. 15, 2014   (EP) ...................................... 14003527

(51) Int. Cl.
*B60R 19/24* (2006.01)
*B60R 19/48* (2006.01)

(52) U.S. Cl.
CPC .............. *B60R 19/24* (2013.01); *B60R 19/48* (2013.01)

(58) Field of Classification Search
CPC ................................ B60R 19/24; B60R 19/34
(Continued)

(56) References Cited

U.S. PATENT DOCUMENTS

| | | |
|---|---|---|
| 1,489,358 A | 4/1924 | Millberg et al. |
| 7,401,825 B2 | 7/2008 | Frank et al. |

(Continued)

FOREIGN PATENT DOCUMENTS

| | | |
|---|---|---|
| DE | 699 02 294 T2 | 2/2003 |
| DE | 10 2008 022 564 A1 | 11/2009 |

(Continued)

OTHER PUBLICATIONS

Non-English International Search Report dated Dec. 4, 2015 for Application No. PCT/EP2015/073476 with English translation.
Espacenet English abstract of DE 10 2008 022 564 A1.

*Primary Examiner* — Jason S Morrow
(74) *Attorney, Agent, or Firm* — Ladas & Parry LLP

(57) ABSTRACT

An attachment device for mounting a bumper cross-beam having a vertical front wall and a vertical rear wall spaced apart by a transverse wall onto a vehicle structure, the attachment device having a first end to be fixed to the vehicle structure and a second end configured to be attached to the bumper cross-beam, the attachment device being made from a hollow section profile, the periphery of which includes opposite side walls and substantially parallel opposite outer walls; the second end includes a flange, which can extend substantially beyond the vertical front wall after mounting the bumper cross beam, and on which a component is attached to the flange in front of said vertical front wall.

9 Claims, 6 Drawing Sheets

(58) Field of Classification Search
USPC ................................................. 293/133, 154
See application file for complete search history.

(56) References Cited

U.S. PATENT DOCUMENTS

| | | | |
|---|---|---|---|
| 2003/0155782 A1* | 8/2003 | Iino ........................ | B60R 19/18 |
| | | | 293/142 |
| 2004/0207217 A1* | 10/2004 | Muller ................... | B60D 1/488 |
| | | | 293/133 |
| 2005/0156443 A1 | 7/2005 | Suzuki et al. | |
| 2007/0222239 A1* | 9/2007 | Arns ....................... | B60R 19/24 |
| | | | 293/132 |
| 2011/0285152 A1* | 11/2011 | Kwon ..................... | B60R 19/24 |
| | | | 293/102 |
| 2013/0320685 A1 | 12/2013 | Imamura et al. | |
| 2016/0121829 A1* | 5/2016 | Murata ................... | B60R 19/34 |
| | | | 293/133 |

FOREIGN PATENT DOCUMENTS

| | | |
|---|---|---|
| EP | 0 860 331 A1 | 8/1998 |
| WO | 00/32444 A1 | 6/2000 |

* cited by examiner

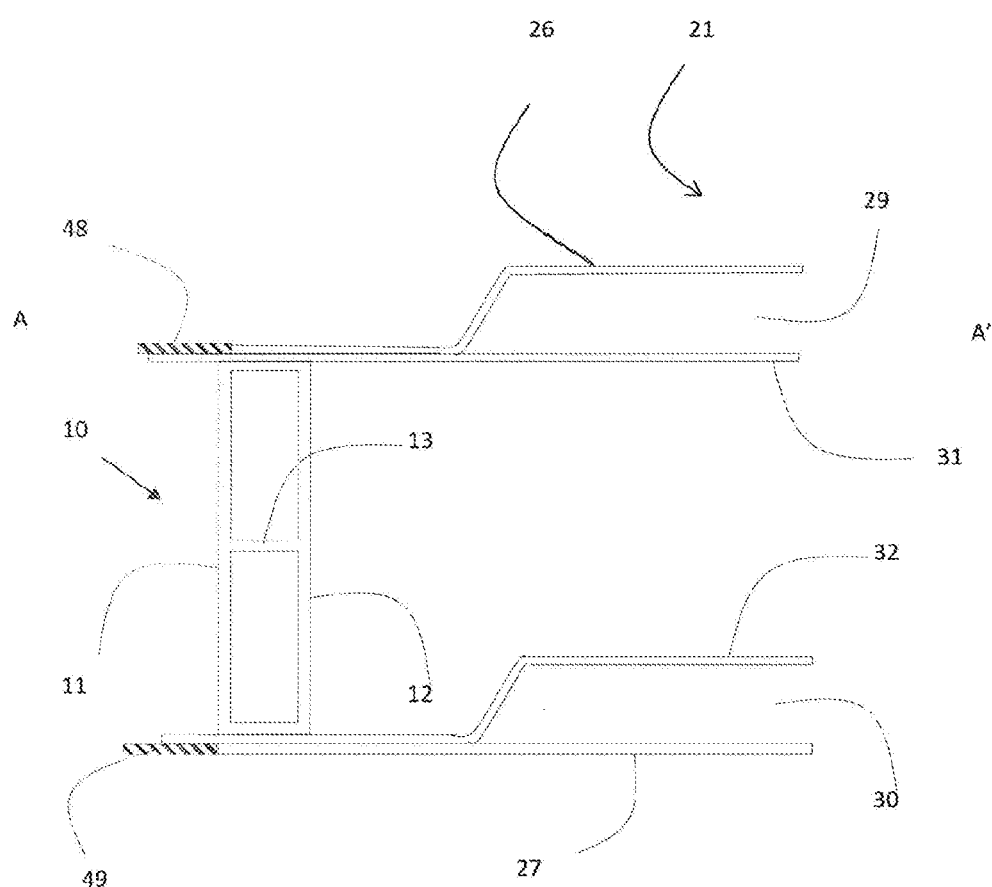

ATTACHMENT FOR BUMPER BEAM ENABLING ADDITIONAL FUNCTION ASSEMBLY

FIELD OF THE INVENTION

The invention relates to attachment means for mounting a bumper cross-beam onto a vehicle structure. The invention relates more particularly to the design of the end of the said attachment means, which is to be fixed to the bumper cross-beam. Such attachment means are advantageously deformation elements, also called "Crash-Box" or "C-Box", which are designed to absorb by plastic deformation as most as possible kinetic energy in case of crash of the vehicle.

BACKGROUND OF THE INVENTION

A bumper cross-beam comprises generally vertical front and rear walls, which play respectively the role of compressive strut and tensile strut in case of collision and which are spaced apart thanks to transverse or flanking walls. These flanking walls are usually horizontal upper and lower walls. Bumper cross-beams are often profiles advantageously extruded from an aluminium alloy, comprising a hollow section member with at least a chamber delimited by the said vertical front and rear walls and horizontal upper and lower flanking walls. Bumper cross-beams are designed such that the force at which they begin to plastically deform is lower than the force necessary to irreversibly deform the vehicle structure. In the case of a minor collision, only the bumper cross-beam is deformed with the result that this sole part has to be replaced. In the past, deformation elements, also called "crash-boxes", have been proposed to increase the maximum force of impact at which there is still no plastic deformation of the vehicle structure. Located between the cross-beam and the vehicle structure (e.g. its longitudinal beams), they are further used as attachment means. They are designed to be plastically deformed as soon as the kinetic energy of the vehicle at the time of the collision is higher than a critical value. Their plastic deformation is advantageously a progressive folding, which absorbs at least partially the energy of impact. The deformation elements are usually in the form of hollow section profiles, generally multi-chamber hollow section profiles, whereby their longitudinal axis lies in the direction of the longitudinal axis of the vehicle.

The U.S. Pat. No. 7,401,825 describes a bumper with an attachment member to be made thereon for the purpose of mounting the bumper onto longitudinal beams of a vehicle, such that section walls acting as compressive and tensile struts and a pair of flanking walls joining them form a hollow section. The attachment member is in the form of a hollow section exhibiting at least one side wall and two transverse walls following on therefrom with a length of hollow section with the longitudinal beam. The hollow section is in the form of a push-fit length matching the inner cross-section of the longitudinal beam. The other end region of the attachment member is provided with collar-type parts projecting from their end edges and aligned approximately parallel to the transverse walls.

German patent application DE 10 2008 022 564 describes a cross beam fastened to body components of a motor vehicle body by supporting elements i.e. absorber element. The cross beam is fastenable to the supporting elements at two retaining positions and/or the supporting elements are fastened to the body components of the body in the retaining positions. The supporting elements comprise a respective retainer for the cross beam, where the retainer is formed by upper and lower bars. The supporting elements are formed from extruded sections or from metal sheets.

There is an increasing need for assembling various additional parts like for example an energy-absorbing element, a pendulum-stopper, an additional energy-absorbing-element for Pedestrian-impact, a radar-sensor; an acceleration-sensor, a horn, module-carriers, supports for fascia, in the front part of the cross-beam.

Traditionally these additional parts are added via cut-outs or holes in the cross-beam and blind rivets nuts. However this solution locally affects the properties of the cross-beam and deteriorates the force intrusion properties. Moreover this necessitates a separate step to drill the holes and a separate step to implement the rivets which increase cost and process length.

Therefore there exists a need for providing means for assembling additional parts in the front part of the cross-beam, without affecting the properties of the cross-beam and deteriorating the force intrusion properties.

SUMMARY OF THE INVENTION

A first object of the invention is an attachment means for mounting a bumper cross-beam having a vertical front wall and a vertical rear wall spaced apart by at least one transverse wall onto a vehicle structure, the said attachment means having a first end to be fixed to the said vehicle structure and a second end designed to be attached to the said bumper cross-beam, the said attachment means being made from a hollow section profile, the periphery of which comprises opposite side walls and substantially parallel opposite outer walls characterised in that the said second end comprises at least one flange, which can extend substantially beyond said vertical front wall after mounting the bumper cross beam.

The attachment means is designed for mounting the said bumper cross-beam onto a vehicle structure, typically, on its longitudinal beams. Advantageously, the said hollow section profile is a section profile extruded from an aluminium alloy, typically an alloy belonging to the 6xxx Aluminium Association series.

Advantageously, the said attachments means are deformation elements, also called "Crash Box" or "C-Box" designed to absorb at least partially the energy of impact by buckling-free progressive plastic folding thereof.

Advantageously, said hollow section profile is a multi-chamber hollow section profile comprising at least a peripheral chamber, being at least delimited by one of the said outer walls and an inner wall which is substantially parallel to the said outer wall and extends between the opposite side walls. Preferably said hollow section profile is a multi-chamber hollow section profile comprising two opposite peripheral chamber.

Preferably, the said hollow section extruded profile is attached to the said bumper cross-beam to have the direction of extrusion of said hollow section extruded profile perpendicular to the long direction of said bumper cross beam. Preferably, one extremity or first end is preferably attached to the said vehicle structure and the other extremity or second end is preferably attached to the said bumper cross-beam.

In one embodiment, said flange is a double walled flange which results from bringing closer together the outer wall and the inner wall of the peripheral chamber until they are in contact, such that the said peripheral chamber collapses. The collapse may be realized by pushing the inner wall towards the outer wall or alternatively by pushing the outer wall towards the inner wall. In an embodiment of the invention there is provided an upper flange and a lower flange, the upper flange can be obtained by collapsing an upper chamber of the hollow section profile and the lower flange can be obtained by collapsing a lower chamber of the hollow section profile. It is possible to adapt the distance between the upper and lower flange by pushing the inner wall towards the outer wall, which provides a greater distance or alternatively by pushing the outer wall towards the inner wall which provides a smaller distance, with any appropriate combination.

In preferred embodiments, the multi-chamber hollow section profiles comprise an upper chamber and a lower chamber separated by a middle chamber. In these embodiments, the walls other than the said opposite outer wall and inner wall, which complete the delimitation of the said peripheral chamber are parts of the said opposite side walls. Since the multi-chamber hollow section profile may comprise more than three chambers, e.g. additional lateral chambers, the walls other than the said opposite outer wall and inner wall, which complete the delimitation of the said peripheral chamber may be walls, which separate the said peripheral chamber from the said lateral chambers.

According to the invention the flange, which can extend substantially beyond said vertical front wall of the bumper cross beam after mounting said bumper cross beam enables to attach a component in front of the vertical front wall of the cross beam. Typically the length of the portion of the flange extending beyond the vertical front wall of the cross-beam is a least one tenth and preferably one fifth of the distance between the opposite side walls of the attachment means, a typical length is between 5 and 80 mm and preferably between 10 and 60 mm.

The portion of the flange which extends beyond the vertical front wall of the cross beam may have the same width as the outer walls of the hollow section profiles. It can also advantageously be cut to a narrower width adapted to the size of the added component. Typically the width of the portion of the flange which extends beyond the vertical front wall of the cross-beam is between three fifth and one fifth of the distance between the opposite side walls of the attachment means, with a typical minimum width of 5 mm. In another embodiment the width of the portion of the flange which extends beyond the vertical front wall of the cross-beam is greater than the distance between the opposite side walls of the attachment means, which is be obtained when the flange is processed by chip-less forming and the folded side walls of the attachment means are made part of the flange.

In an embodiment of the invention a reinforcement part is added on the flange, for example to facilitate bolting of the added component. The reinforcement part may advantageously have the shape of the portion of the flange which extends beyond the vertical front wall of the cross beam. Advantageously, when the attachment means is made of a multi chamber hollow section having peripheral chambers with an outer wall and an inner wall, the outer wall may be cut out and the reinforcement attached to the inner wall.

Advantageously, the bumper cross-beam is also a hollow section profile made of an extruded section from an aluminium alloy, typically an alloy belonging to the 6xxx Aluminium Association series.

Another object of the invention is a bumper system comprising a bumper cross beam and at least an attachment means according to the invention. The bumper system advantageously comprises a component attached to the flange in front of the vertical front wall. The component may be for example an energy-absorbing element, a pendulum-stopper, an additional energy-absorbing-element for pedestrian-impact, a radar-sensor, an acceleration-sensor, a horn, a module-carrier, and a support for a fascia.

Compared to prior art solution wherein the components are added via cut-outs or holes in the cross-beam and blind rivets nut, the invention is advantageous because the cross beam is not weakened by the addition of the component. The energy absorption potential may even be improved if the added component has energy-absorbing properties.

Yet another object of the invention is a process for manufacturing a bumper system comprising an attachment means, a bumper cross-beam and a component, the said process comprising following successive steps:

a) providing a hollow section profile, with a cross-section having a periphery comprising opposite side walls, and opposite outer walls, b) cutting the said hollow section profile at a predetermined length to obtain a profile part;

c) at one of the ends of the said profile part, providing at least one flange to obtain an attachment means d) providing a bumper cross beam having a vertical front wall and a vertical rear wall spaced apart by at least one transverse wall d) assembling said attachment means to said cross-beam in such a way that said flange extends substantially beyond said vertical front wall of the bumper cross beam, e) assembling the component to the flange, in front of the vertical front wall of the cross bream.

In order to obtain at least one flange, methods such as cutting out the opposite side walls and optionally one outer wall, collapsing a peripheral chambers after optionally cutting out side walls, cutting out inner walls may be appropriate.

DRAWINGS

FIG. 6 is a cross-section of second end of a bumper system according to the invention, showing addition of a reinforcement part.

DETAILED DESCRIPTION, OF THE INVENTION

Figure 1:
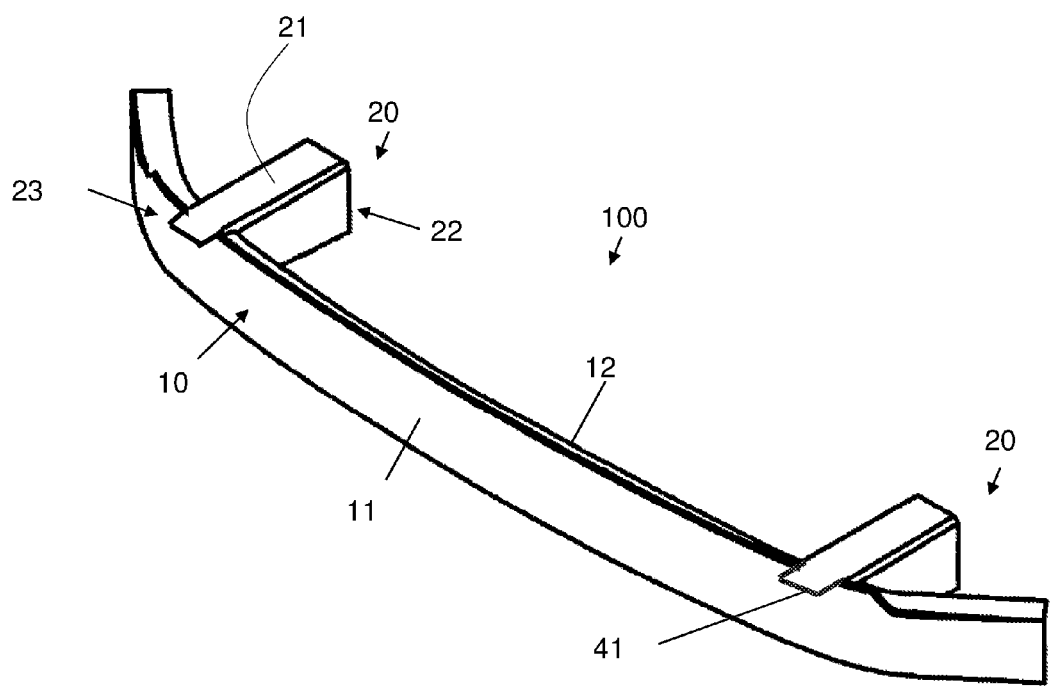
FIG. 1 is a perspective view of a bumper system according to the invention.

Referring to FIG. 1, there is provided a perspective view of a bumper system according to the invention. The bumper system (100) comprises a bumper cross-beam (10) and two attachment means (20) for mounting the said bumper cross-beam onto the longitudinal beams of a vehicle (not illustrated). The bumper cross-beam comprises a front wall (11) and a rear wall (12) spaced apart thanks to flanking walls. Each attachment means is made from a hollow section profile (21) having a first end (22) to be fixed to the said longitudinal beams of the vehicle structure and a second end

(23) designed to attach the said bumper cross-beam (10). A flange (41) extends substantially beyond said vertical front wall (11) of the bumper cross beam (10) which can be used to fix a component in front of the front wall.

Figure 2:
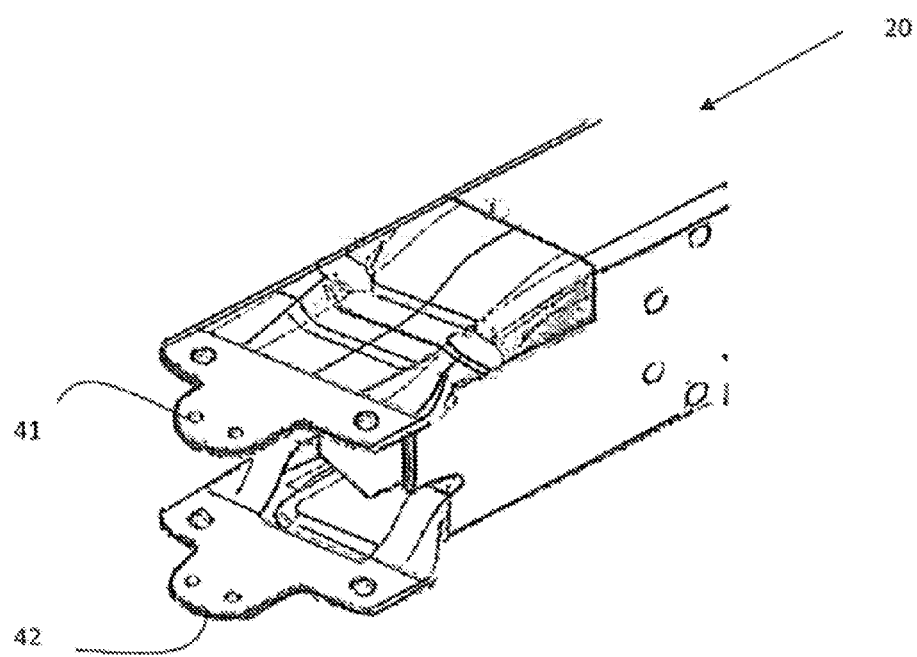
FIG. 2 is a perspective view of the second end of an attachment means according to the invention.

Referring to FIG. 2 there is provided a detailed perspective view of an embodiment of the second end of an attachment means (20) according to the invention, showing flanges (41) and (42) which can be used to fix a component.

Figure 3:
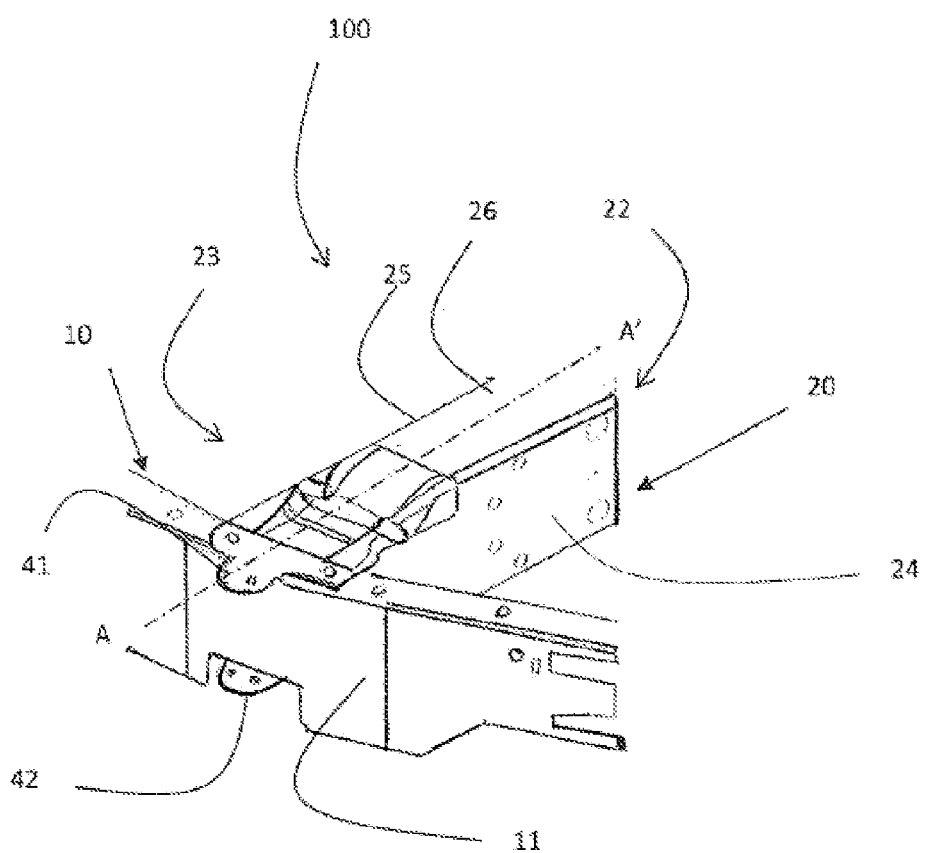
FIG. 3 is a perspective detailed view of an attachment means and a cross beam for a bumper system according to the invention.
Figure 4:
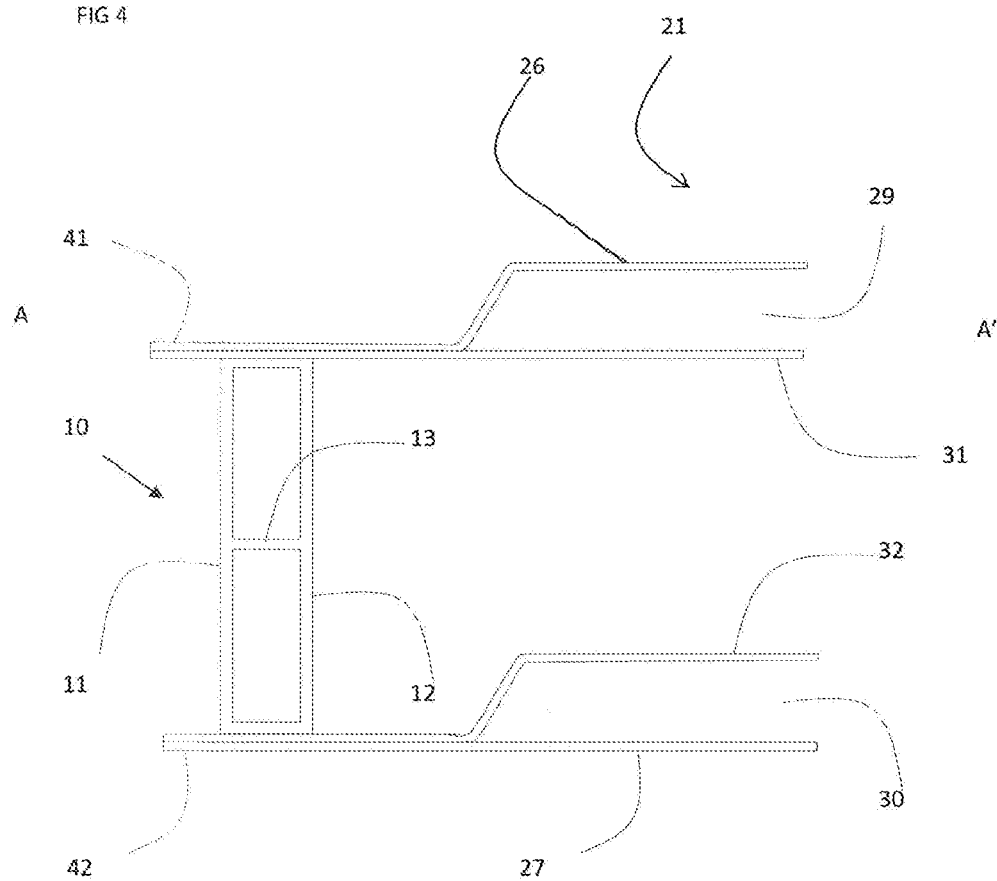
FIG. 4 is a cross-section of second end of a bumper system according to the invention.

Referring to FIGS. 3 and 4, there is provided an embodiment of the invention. FIG. 4 is a cross section of the assembly according to the dotted line (A:A') shown on FIG. 3. The attachment means (20) which is, in the illustrated embodiment a crash-box, is fixed to a cross-beam (10) made of a hollow profile having a vertical front wall (11) and a vertical rear wall (12) spaced apart by at least one transverse wall (13). The said attachment means has a first end (22) designed to be fixed to the vehicle structure and a second end (23) designed to be attached to the said bumper cross-beam. The said attachment means is made from a hollow section profile (21), the periphery of which comprises opposite side walls (24 and 25) and substantially parallel opposite outer walls (26 and 27). In the illustrated embodiment the hollow section profile (21) comprises three chambers, the lower chamber (30) is at least delimited by the lower outer wall (27) and a lower inner wall (32), which is substantially parallel to the lower outer wall and extends between the opposite side walls (24 and 25). The upper chamber (29) is at least delimited by the upper outer wall (26) and an upper inner wall (31), which is substantially parallel to the said upper outer wall and extends between the opposite side walls (24 and 25). The said second end (23) comprises two flanges (41, 42), which extend substantially beyond said vertical front wall (11) of the bumper cross beam (10). In the illustrated embodiment, said flanges (41, 42) are double-walled flanges which result from bringing closer together the outer wall and the inner wall of the peripheral chambers (29, 30) until they are in contact, such that the peripheral chamber collapses. Specifically illustrated is an upper flange obtained by pushing the upper outer wall (21) towards the upper inner wall (31) and a lower flange obtained by pushing the lower inner (32) wall towards the lower outer wall (27). The length of the flanges is adapted to extend substantially beyond said vertical front wall (11) of the cross-beam (10).

Figure 5:
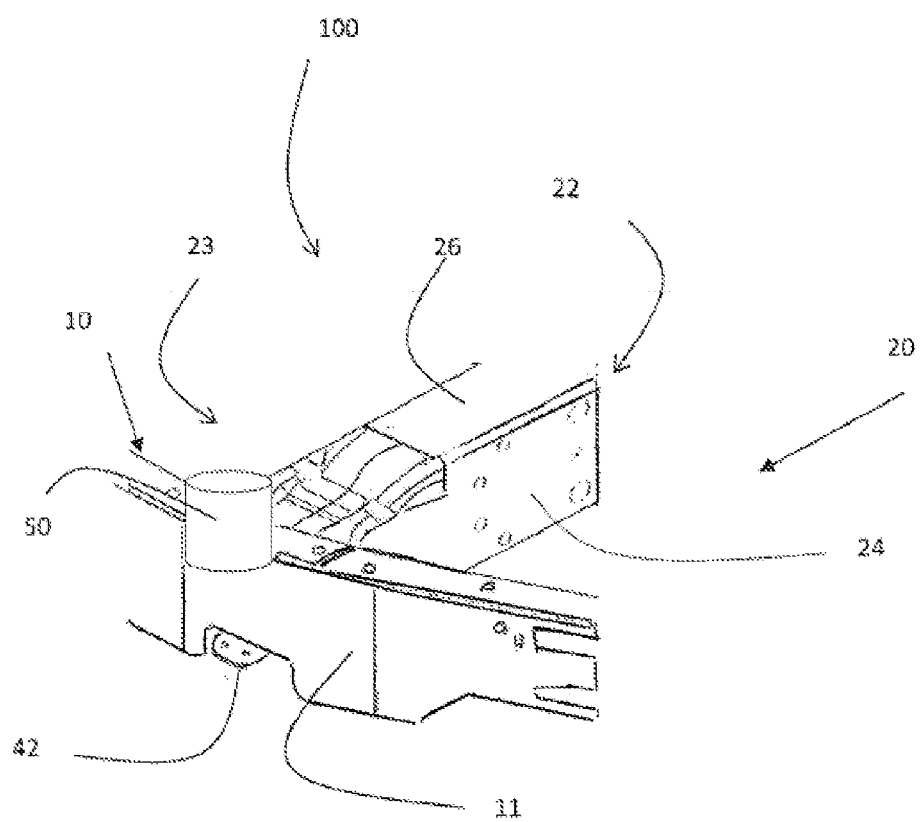
FIG. 5 is a perspective view of a bumper system according to the invention, illustrating the attachment of a component.

Illustrated by FIG. 5 is a local view of a bumper assembly according to the invention wherein a component (50) has been attached to the flange (41).

Referring to FIG. 6 there is provided a cross-section view of second end of a bumper system according to the invention wherein reinforcement parts (48,49) are added on the flange, for example to facilitate bolting of the added component and wherein a part of the outer walls (26, 27) has been cut out to facilitate the addition of the reinforcement part.

The invention claimed is:

1. An attachment device for mounting a bumper cross beam onto a vehicle structure, said attachment device comprising:
    a first end configured to be fixed to said vehicle structure, and a second end configured to be attached to said bumper cross-beam, and
    a hollow section profile,
    wherein a periphery of the hollow section profile comprises opposite side walls, and substantially parallel opposite outer walls,
    wherein the said second end comprises a flange configured to extend substantially beyond a front wall of the bumper cross-beam when the attachment device is attached to the bumper cross-beam, and
    a component attached to a portion of said flange extending beyond the front wall of the bumper cross-beam when the attachment device is attached to the bumper cross-beam.

2. The attachment device according to claim 1, wherein said hollow section profile comprises a peripheral chamber delimited by one of said outer walls, and an inner wall, which is substantially parallel to said outer wall and extends between said opposite side walls, and
    wherein said flange is configured by bringing together one of the opposite outer walls and one of the opposite inner walls until they are in contact, such that said peripheral chamber collapses.

3. The attachment device according to claim 1, wherein a length of the portion of the flange extending beyond the vertical front wall of the cross-beam is at least one-tenth of the distance between the opposite side walls.

4. The attachment device according to claim 1, wherein said flange has a width narrower than a width of the outer walls of the hollow section profile.

5. The attachment device according to claim 1, wherein the flange comprises a reinforcement part.

6. A bumper system comprising a bumper cross-beam and the attachment device according to claim 1.

7. The attachment device according to claim 1, wherein the component is selected from the group consisting of an energy-absorbing element, a pendulum-stopper, an additional energy-absorbing-element for pedestrian-impact, a radar-sensor, an acceleration-sensor, a horn, a module-carrier, and a support for a fascia.

8. A process for manufacturing a bumper system comprising an attachment means, a bumper cross-beam and a component, said process comprising the following successive steps:
    providing a hollow section profile, with a cross-section having a periphery comprising opposite side walls, and opposite outer walls,
    cutting said hollow section profile at a predetermined length to obtain a profile part;
    at one of the ends of said profile part, providing a flange to obtain an attachment device,
    providing a bumper cross-beam having a vertical front wall and a vertical rear wall spaced apart by at least one transverse wall,
    assembling said attachment device to said cross-beam so that said flange extends substantially beyond said vertical front wall of the bumper cross-beam,
    assembling the component to the flange,
    wherein said flange is obtained by cutting out the opposite side walls and one of the opposite outer walls, and/or collapsing a peripheral chamber after cutting out the opposite side walls and/or cutting out opposite inner walls.

9. The attachment device according to claim 1, wherein a length of the portion of the flange extending beyond the vertical front wall of the cross-beam is at least one-fifth of the distance between the opposite side walls.

* * * * *